US008898566B1

(12) United States Patent
Rachabathuni

(10) Patent No.: US 8,898,566 B1
(45) Date of Patent: *Nov. 25, 2014

(54) LAST SCREEN RENDERING FOR ELECTRONIC BOOK READERS

(75) Inventor: Sailesh Rachabathuni, Santa Clara, CA (US)

(73) Assignee: Amazon Technologies, Inc., Seattle, WA (US)

(*) Notice: Subject to any disclaimer, the term of this patent is extended or adjusted under 35 U.S.C. 154(b) by 491 days.

This patent is subject to a terminal disclaimer.

(21) Appl. No.: 13/070,328

(22) Filed: Mar. 23, 2011

(51) Int. Cl.
*G06F 13/00* (2006.01)
*G06F 15/00* (2006.01)
*G06F 5/00* (2006.01)
*G06F 3/0484* (2013.01)

(52) U.S. Cl.
CPC .............. *G06F 5/00* (2013.01); *G06F 3/0484* (2013.01)
USPC ........................................ 715/708; 715/707

(58) Field of Classification Search
CPC ................................ G06F 5/00; G06F 3/0484
USPC ......... 715/808, 867, 716, 863, 707–708, 710, 715/738, 784, 741
See application file for complete search history.

(56) References Cited

U.S. PATENT DOCUMENTS

| 7,057,591 | B1* | 6/2006 | Hautanen et al. ............... 345/87 |
| 7,920,320 | B2 | 4/2011 | Watson et al. |
| 8,018,431 | B1 | 9/2011 | Zehr et al. |
| 8,161,198 | B2 | 4/2012 | Kikuchi |
| 2002/0126140 | A1 | 9/2002 | Gorbet et al. |
| 2004/0049743 | A1* | 3/2004 | Bogward ...................... 715/531 |
| 2006/0109242 | A1 | 5/2006 | Simpkins |
| 2006/0145950 | A1 | 7/2006 | Tanaka |
| 2009/0231233 | A1* | 9/2009 | Liberatore ..................... 345/1.3 |
| 2009/0267909 | A1 | 10/2009 | Chen et al. |
| 2010/0095340 | A1 | 4/2010 | Ei et al. |
| 2010/0164888 | A1 | 7/2010 | Okumura et al. |
| 2010/0188327 | A1 | 7/2010 | Frid et al. |
| 2010/0328223 | A1 | 12/2010 | Mockarram-Dorri et al. |
| 2011/0050594 | A1 | 3/2011 | Kim et al. |
| 2011/0057884 | A1 | 3/2011 | Gormish et al. |
| 2011/0069073 | A1 | 3/2011 | Unger |
| 2012/0001923 | A1 | 1/2012 | Weinzimmer et al. |
| 2012/0197998 | A1* | 8/2012 | Kessel et al. .................. 709/205 |

OTHER PUBLICATIONS

Office action for U.S. Appl. No. 12/567,984, mailed on Mar. 15, 2013, Kim, "Last Screen Rendering for Electronic Book Readern", 10 pages.

Non-Final Office Action for U.S. Appl. No. 12/567,984, mailed on Sep. 27, 2012, John T. Kim, "Last Screen Rendering for Electronic Book Reader", 9 pages.

(Continued)

*Primary Examiner* — Kevin Nguyen
(74) *Attorney, Agent, or Firm* — Lee & Hayes, PLLC

(57) ABSTRACT

A handheld dedicated electronic book ("eBook") reader device renders an image on a screen during periods of inactivity of the device. The device detects certain screen conversion events such as a timeout period or a user indication. Upon detection of such events, the device renders, as the last screen image to remain visible after the user ceases using the device, an image that conveys some meaningful association with a content item accessible by the device. In the context of eBooks, the eBook reader device renders a representation of an author of the eBook as the last screen image. A highlighted portion of the eBook may additionally or alternatively be presented as the last screen image.

36 Claims, 13 Drawing Sheets

(56) References Cited

OTHER PUBLICATIONS

Barnes & Noble, "Nook User Guide", retrieved from the Internet Feb. 5, 2013, 120 pgs.

"Kobo Wireless eReader & Desktop Application User Guide", Feb. 2011, 170 pgs.

Office action for U.S. Appl. No. 12/886,877, mailed on Sep. 11, 2013, Belin et al., "Cover Display", 31 pages.

Office Action for U.S. Appl. No. 12/886,877, mailed on Aug. 13, 2014, Belin et al., "Cover Display", 40 pages.

Office Action for U.S. Appl. No. 12/886,877, mailed on Feb. 21, 2014, Gilles Jean Roger Belin, "Cover Display", 36 pages.

* cited by examiner

LAST SCREEN RENDERING FOR ELECTRONIC BOOK READERS

BACKGROUND

A large and growing population of users is enjoying entertainment through the consumption of digital media items, such as music, movies, images, electronic books, and so on. The users employ various electronic devices to consume such media items. Among these electronic devices are electronic book readers, cellular telephones, personal digital assistant (PDA), portable media players, tablet computers, netbooks, and the like.

One particular device that is gaining in popularity is the dedicated electronic book ("eBook") reader device, which attempts to mimic the experience of reading a conventional book through display of electronic information on one or more electronic displays. As the quantity of available media content continues to grow, along with increasing proliferation of such dedicated devices to consume that media content, finding ways to enhance user experience continues to be a priority. As eBook reader devices continue to evolve, there remains a need for improving a reader's ability to relate comfortably with the eBooks, and begin to feel as though he is picking up the book itself, rather than a generic electronic device.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

This disclosure describes last screen rendering techniques to enhance user experience with a dedicated handheld electronic book ("eBook") reader device. The eBook reader device is designed to allow users to read or otherwise consume electronic content (e.g., text, graphics, audio, multimedia, and the like), such as that found in eBooks (e.g., books, magazines, newspapers, periodicals, or other types of electronic documents), RSS feeds, audio books, and the like. The eBook reader device described herein employs electronic paper ("ePaper") display technology. A characteristic of ePaper display technology is that the display is bi-stable, meaning that it is capable of holding text or other rendered images even when very little or no power is supplied to the display. Thus, the last screen image rendered on the display can be maintained and visible for very long periods of time, such as days or weeks.

The techniques described herein enhance user experience by enabling the eBook reader device to render, as the last screen image to remain visible after the user ceases using the device, an image that conveys to the user some meaningful association with a content item. For instance, in the case of eBooks, the eBook reader device renders a representation of an author of a book as the last screen image. In this manner, the eBook reader device projects an identity of a content item, rather than as a generic electronic device.

For discussion purposes, the techniques are described primarily in the context of an eBook reader device used to facilitate reading of electronic books. However, the features discussed below may be applied to other content items, such as audio books, and so forth.

Illustrative eBook Reader Device

Figure 1:
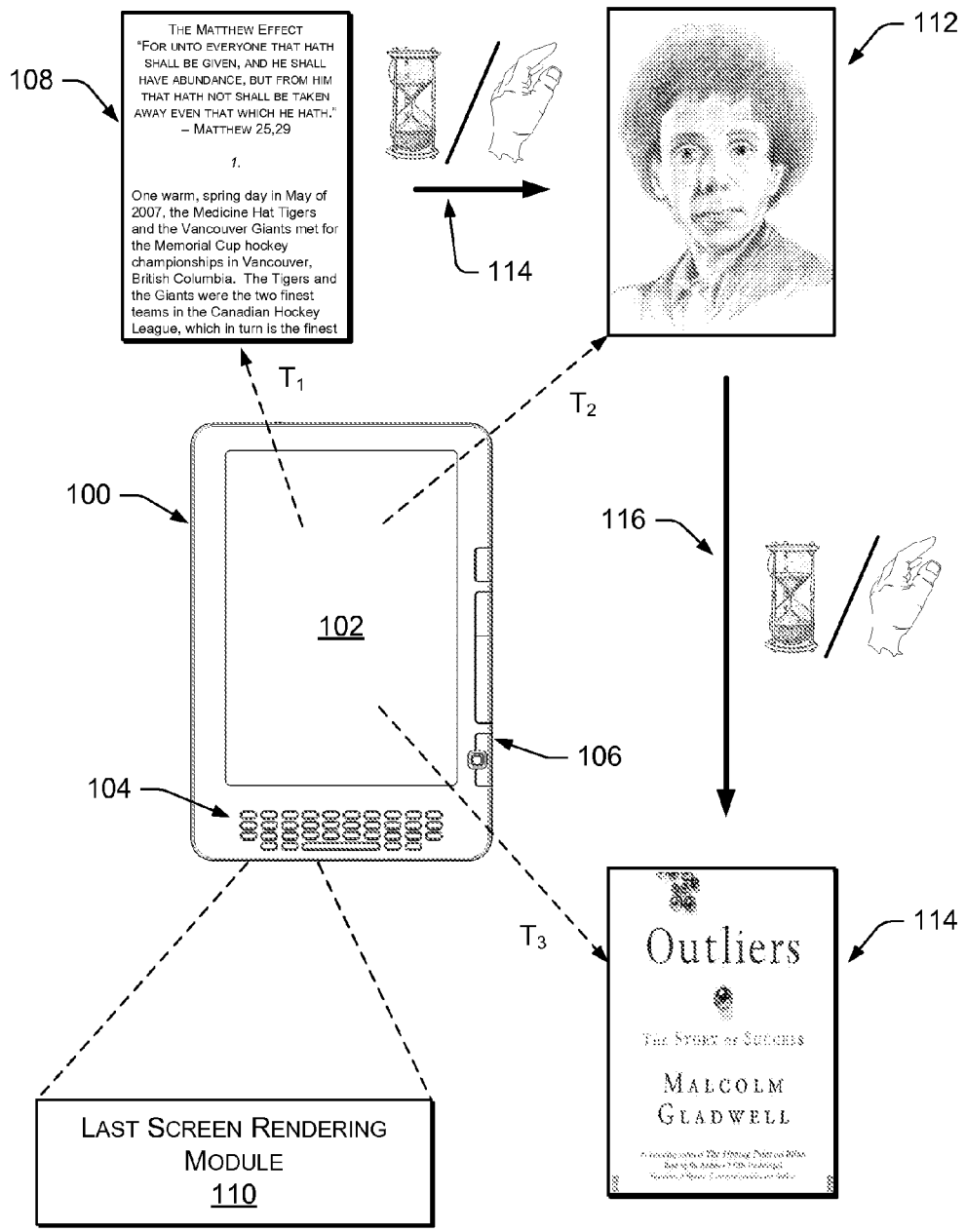
FIG. 1 illustrates one exemplary implementation of a handheld dedicated electronic book ("eBook") reader device that implements last screen rendering techniques to leave a last screen image on the eBook reader device that is relevant to content that a user has most recently consumed.

FIG. 1 illustrates an exemplary eBook reader device 100 that is embodied as a handheld, dedicated eBook reader device. The eBook reader device 100 is equipped with a passive display 102 to present content in a human-readable format to a user. The content presented on the display 102 may take the form of electronic books or "eBooks." For example, the display 102 depicts the text of the eBooks and also any illustrations, tables, or graphic elements that might be contained in the eBooks. The terms "book" and/or "eBook," as used herein, include electronic or digital representations of printed works, as well as digital content that may include text, multimedia, hypertext, and/or hypermedia. Examples of printed and/or digital works include, but are not limited to, books, magazines, newspapers, periodicals, journals, reference materials, telephone books, textbooks, anthologies, instruction manuals, proceedings of meetings, forms, directories, maps, web pages, and so forth. Accordingly, the terms "book" and/or "eBook" may include any readable or viewable content that is in electronic or digital form.

The display 102 may further include touch screen capabilities that allow user input through contact or gesturing relative to the display. For convenience only, the display 102 is shown in a generally rectangular configuration. However, it is understood that the display 102 may be implemented in any shape, and may have any ratio of height to width. Also, for stylistic or design purposes, the touch-screen display 102 may be curved or otherwise non-linearly shaped.

The eBook reader device 100 also has a keyboard 104 beneath the display 102 and one or more actuatable controls 106 that may have dedicated or assigned operations. For instance, the actuatable controls 106 may include page turning buttons, a joystick, navigational keys, a power on/off button, selection keys, joystick, touchpad, and so on.

In FIG. 1, the display 102 is shown depicting a current page 108 of the eBook version of the work titled, "Outliers" by Malcolm Gladwell. This represents a point in time $T_1$ at which the user is actively reading through the eBook. The term "page" as used herein refers to a collection of content that is presented at one time on the display 102. Thus, a "page" may be understood as a virtual frame of the content, or a visual display window presenting the content to the user. Accordingly, "pages" as described herein are not fixed permanently, in contrast to the pages of published "hard" books. Instead, pages described herein may be redefined or repaginated when, for example, the user chooses a different font or font size for displaying the content on the display 102.

The eBook reader device 100 has various internal electronic components and software modules, which include a last screen rendering module 110 that is responsible for rendering the final image presented on the display 102 after the user ceases reading the eBook. The last screen rendering module 110 may include a timer to track a time period from the last user input. When a sufficient time period has lapsed, the last screen rendering module 110 assumes that the user is likely to have ceased reading the eBook. In response, the last screen rendering module 110 renders one more screen image before entering a dormant or sleep mode. The last screen image is chosen to convey something meaningful about the eBook. In one implementation, the last screen image is a representation of the author of the eBook.

In FIG. 1, suppose that the last screen rendering module 110 determines that a sufficient time period has lapsed since the user has last interacted with the current page 108 in the "Outliers" book. The last screen rendering module 110 replaces the current page 108 with an image of the author, Malcolm Gladwell, 112, as represented by the temporal lapse transition 114. Thus, the book cover image 112 is depicted at a time $T_2$ after a predefined time lapse from the last user interaction.

As an alternative to time lapse, the last screen rendering module 110 may further detect when the user proactively inputs a command to transition the eBook reader device 100 from an active state to a non-active state (e.g., sleep, rest, lower power level, etc.). The user may, for example, input a command using a touch screen 102 (if available), the keyboard 104, or actuatable controls 106 to "power down" or otherwise force the device 100 into a non-active state. In response, the last screen rendering module 110 may then replace the current page 108 with the author image 112.

In another implementation, the last screen rendering module 110 may further render a different screen image with a meaningful association to the eBook. For example, the last screen rendering module 110 may change the screen image from the author image 112 to an image of a book cover 114. Alternatively, the author image 112 may be replaced by the image of an additional author associated with the eBook, a portion of the eBook highlighted by the user of the device 100, or another image associated with the eBook. Thus, the book cover image 114 is depicted at a time $T_3$ after a predefined time lapse from the display of the author image 112.

In FIG. 1, this is illustrated by another temporal lapse transition 116 that occurs after the device 100 has been in a dormant or inactive state for a period of time. Both of the temporal lapse transitions 114 and 116 may be explicitly entered by the user, automatically generated by the device based on default settings (e.g. 1 minute, 5 minutes, 10 minutes, etc.), or learned from the user's behavior. For example, if the user tends to have periods of inactivity about three minutes, the device 100 may infer that the user typically takes three minutes to read a page and a device will then set the first temporal lapse transition 114 for a period of time greater than three minutes. In some implementations, the first temporal lapse transition 114 may be set as a multiplier of the user's average page read time such as twice the user's average page read time of three minutes which would result in a temporal lapse transition 114 time of six minutes.

Changing the displayed image periodically during times when the device 100 is inactive may create visual interest for the user of the device 100. Depending on the technology used for the display 102, periodic alteration of the displayed image may also prevent damage or "burn in" to the display 102. In such cases, the second temporal lapse transition 116 may be determined in part by an amount of time that the display 102 can maintain a static image without risk of damage. Thus, operation of the last screen rendering module 110 may function as a "screen saver."

As an alternative to time lapse, the last screen rendering module 110 may detect when the user proactively inputs a command to transition from the initially displayed author image 112 to a different image associated with the eBook such as the book cover 114. For example, pressing a button on the keyboard 104, touching the display 102, or activating an accelerometer by shaking/moving the device 100 may initiate transition 116 before the specified period of time has lapsed.

Figure 2:
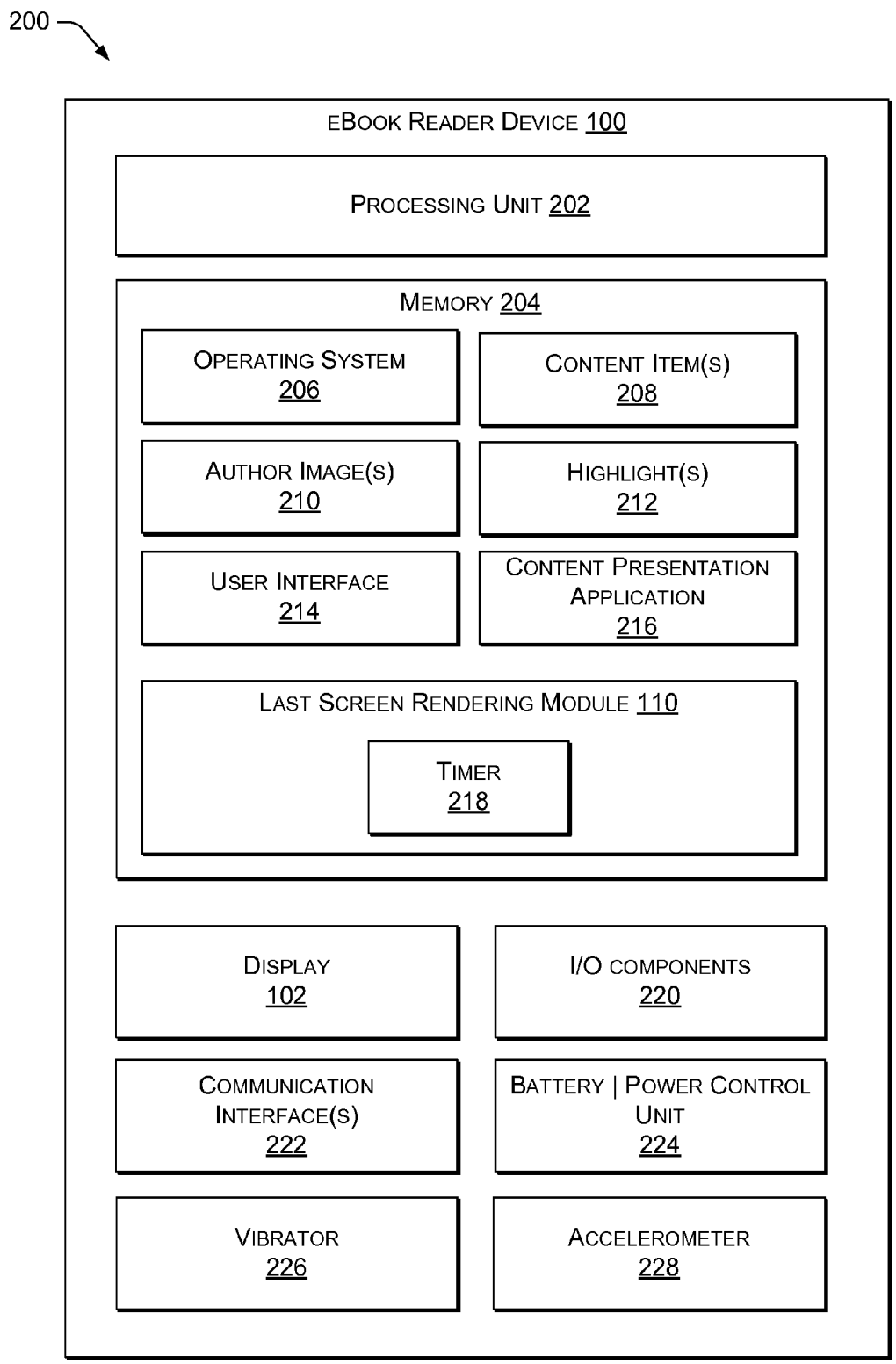
FIG. 2 is a block diagram showing selected components of the eBook reader device.

FIG. 2 illustrates a block diagram 200 of selected functional components that might be implemented within the eBook reader device 100. In a very basic configuration, the device 100 includes a processing unit 202 composed one of one or more processors, and memory 204. Depending on the configuration of a dedicated eBook reader device 100, the memory 204 is an example of a computer-readable storage medium and may include volatile and nonvolatile memory. Thus, the memory 204 may include, but is not limited to, RAM, ROM, EEPROM, flash memory, or other memory technology, or any other tangible medium which can be used to store media items or applications and data which can be accessed by the eBook reader device 100.

The memory 204 may be used to store any number of functional components that are executable on the processing unit 202, as well as data and content items that are rendered by the eBook reader device 102. Thus, the memory 204 may store an operating system 206 and an eBook storage database to store one or more content items 208, such as eBooks and audio books.

The memory 204 may also store one or more author images 210 associated with the content item(s) 208. In some instances, for example when a book has multiple authors, more than one author image 210 may be associated with a single content item 208. One or more highlights 212 selected from a content item 208 may also be associated with the content item 208. The highlights may include portions of a content item 208 (e.g., text, graphics, etc.) that the user of the eBook reader device 100 selects. As well as the previously mentioned user highlights, the highlight(s) 212 may additionally or alternatively include highlights selected by an author of the content item 208. Both the author image(s) 210 and the author highlights included in the highlight(s) 212 may be bundled or otherwise linked to the respective content item 208 such that the appropriate author image(s) 210 and/or author highlights are placed in the memory 204 when the associated content item 208 is placed in the memory 204.

The memory may further include a memory portion designated as an immediate page memory to temporarily store one or more pages of an electronic book. The pages held by the immediate page memory are placed therein a short period before a next page request is expected.

A user interface (UI) module 214 may also be provided in memory 204 and executed on the processing unit 202 to facilitate user operation of the device 100. The UI module 214 may provide menus and other navigational tools to facilitate selection and rendering of the content items 208. The UI module 214 may further include a browser or other application that facilitates access to sites over a network, such as websites or online merchants.

A content presentation application 216 renders the content items 208. The content presentation application 216 may be implemented as various applications depending upon the content items. For instance, the content presentation application 216 may be an electronic book reader application for rending electronic books, or an audio player for playing audio books, or a video player for playing video, and so forth.

The last screen rendering module 110 may also be implemented as a software module stored in memory 204 and executable on the processing unit 202. The last screen rendering module 110 detects screen conversion events, such as time lapses, user indications (e.g. "power down" or sleep commands), and so forth. Upon detecting a screen conversion event, the last screen rendering module 110 directs the display 102 to present a visible representation associated with a content item with which the user was last interacting. In some implementations, for example when the user's last interactions with the device 100 were not with any particular content item (e.g., powering down the device from a "home" or menu screen), the last screen rendering module 110 may present a visual representation associated with any one or a combination of the content items 208 stored in the memory 204.

In the case of electronic books, the last screen rendering module 110 may render images of authors 210 associated with the electronic books. In this manner, the eBook reader device is left standing with a screen depicting the author of the last book that the reader was reading or images of the authors of books included in the content item(s) 208 portion of the memory 204. Thus, the eBook reader device may be identified more by the authors of the content contained within the device than as an electronic device.

The last screen rendering module 110 may implement different mechanisms for determining when to render the last screen image and for determining when to change the last screen image. Illustrated mechanisms include a timer 218 and detection of a user indication.

The timer 218 is configured to detect when the user ceases interacting with the eBook reader device 100 for a threshold period of time. The threshold period may be user configurable. In one implementation, the threshold period is at least five minutes, although longer or shorter durations are possible. The threshold period may be based upon the average time it takes the user to read a page of text on the device 100. This threshold may be different for different users (e.g., identified when a user logs on to the device 100) or for different types of content. For example, textbooks may be associated with a longer average page read time than novels.

When the timer 218 reaches the threshold period, a screen conversion event is generated, causing the last screen rendering module 110 to render a different image on the display 102 that will visibly persist until the user once again begins interacting with the eBook reader device 100 or until the last screen rendering module 110 changes the displayed image. In the context of electronic books, the last screen rendering module 110 may convert the screen image to that of the book's author, rather than a particular page. The last screen rendering module 110 may, after a second threshold period, change the initially displayed last screen image (e.g., an image of the book's author) to a different image such as the book's cover.

As shown in both FIGS. 1 and 2, the eBook reader device 100 has a display 102. In one implementation, the display uses ePaper display technology. As noted above, the ePaper display technology is bi-stable, meaning that it is capable of holding text or other rendered images even when very little or no power is supplied to the display. Since the ePaper display can last for days or weeks or may be even months, the last screen image may remain visible on the device for long periods until the user once again begins interacting with the device. Some exemplary ePaper-like displays that may be used with the implementations described herein include bi-stable LCDs, MEMS, cholesteric, pigmented electrophoretic, and others. In other implementations, or for other types of devices, the display may be embodied using other technologies, such as LCDs and OLEDs, and may further include a touch screen interface. In some implementations, a touch sensitive mechanism may be included with the display to form a touch-screen display.

In the same or different implementations, the display 102 may be a flexible display and further include a touch sensitive membrane, film, or other form of sensing material. The flexible display may be positioned, for example, above a touch sensor(s). The touch sensor(s) may be a resistive touch sensitive film. The flexible display may also include a protective layer made of a flexible material such as plastic. The flexible display may also include a flexible backplane layer. The backplane may also be made of a flexible material, such as plastic, metal, glass or a polymer based material. A flexible backplane may be bendable, rollable, light-weight, etc. In one configuration, the flexible backplane is a matrix backplane on a plastic substrate.

The eBook reader device 100 may further be equipped with various input/output (I/O) components 220. Such components may include various user interface controls (e.g., buttons, joystick, keyboard, etc.), audio speaker, microphone or audio input, connection ports, and so forth.

One or more communication interfaces 222 are provided to facilitate communication with external, remote computing sources over various networks or with other local devices. Content (e.g., eBooks, magazines, audio books, etc.), program modules, and screen conversion events, may be transferred to the eBook reader device 100 via the communication interfaces(s) 222. The communication interface(s) 222 support both wired and wireless connection to various networks, such as cellular networks, radio, WiFi networks, short range networks (e.g., Bluetooth), infrared (IR), and so forth. The communication interface(s) 222 support both wired and wireless communications with various types of networks, including the Internet. For example, the eBook reader device 100 may be equipped with a radio frequency transceiver to facilitate wireless communication over a wireless network. The device may further include a communication connection that facilitates communication with other devices via, for example, Bluetooth, radio frequency, or infrared connection(s). The communication interface(s) 222 are one example of communication media. Communication media may typically be embodied by computer readable instructions, data structures, program modules, or other data in a modulated data signal, such as a carrier wave or other transport mechanism. Communication media is to be distinguished from computer-readable storage media.

The eBook reader device 100 also includes a battery and power control unit 224. The power control unit 224 operatively controls an amount of power, or electrical energy, consumed by the eBook reader device 100. Actively controlling the amount of power consumed by the eBook reader device 100 may achieve more efficient use of electrical energy stored by the battery. The processing unit 202 may supply computing resources to the power control unit 224, which may further include a clock/timer for accurate control of power consumed by the eBook reader device 100.

The eBook reader device 100 may have additional features or functionality. For example, the eBook reader device 100 may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data. In some implementations the eBook reader device 100 may also include a vibrator 226 or other output device for creating a haptic output that is detectable by a user touching the eBook reader device 102. The eBook reader device 100 may include, in some implementations, an accelerometer 228 for detecting movement or orientation of the device.

Illustrative Processes and Last Screen Images

Figure 3:
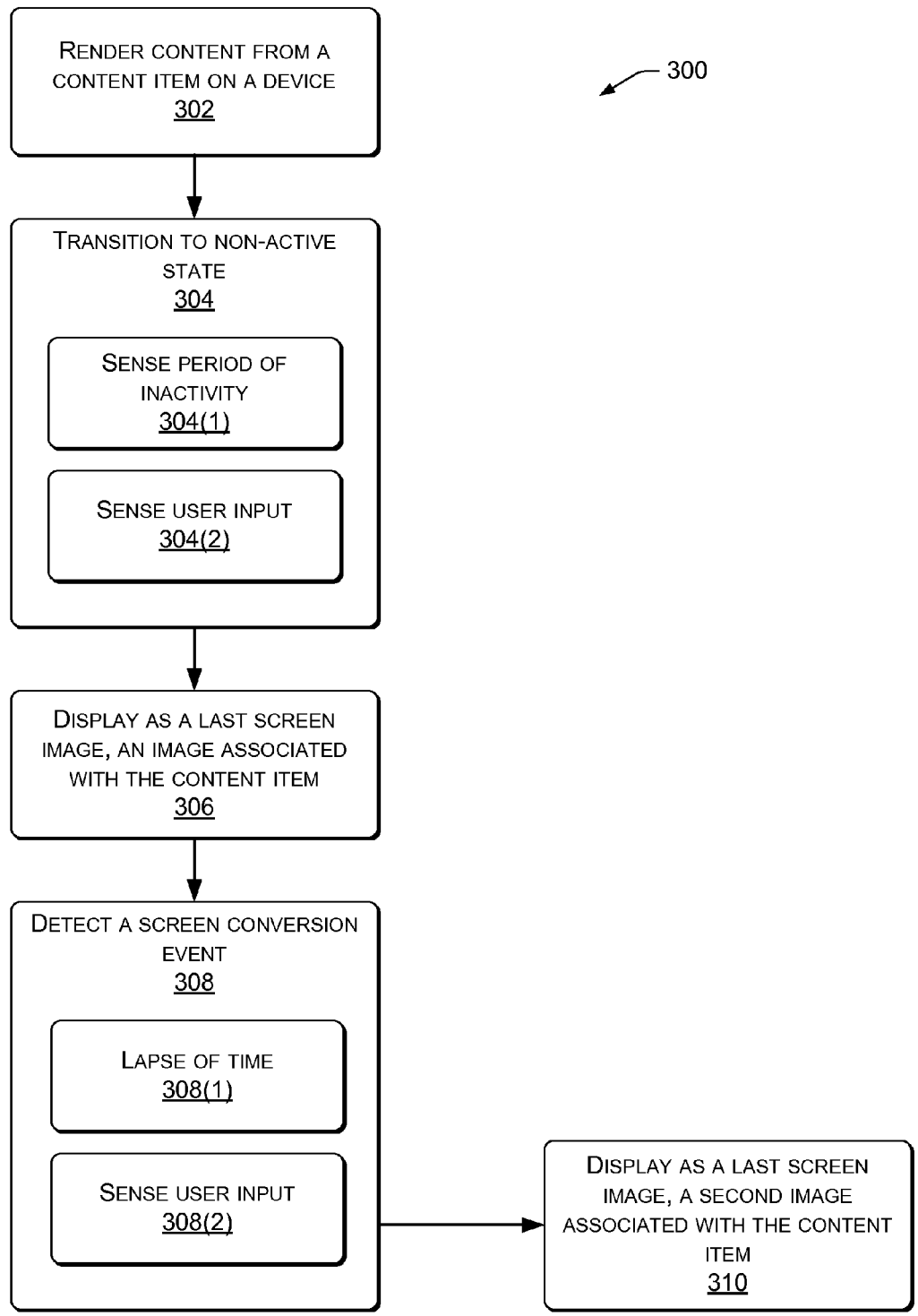
FIG. 3 is a flow diagram illustrating an exemplary process for converting a display of an eBook reader device from its current image to a last screen image that allows the eBook reader device to more readily convey an identity of a content item.

FIG. 3 shows a process 300 for changing a display of a device to show a last screen image when the device is transitioned to a non-active state. For ease of understanding, the process 300 (as well as process 1000 in FIG. 10) is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

The process 300 begins during normal user interaction with the device. The device may be an eBook reader or another type of media rendering device such as a digital audio player or video player. During this time, the user is consuming content items, such as eBooks, audio books, songs, videos, and so forth. Accordingly, at 302, content from the content item is rendered on the device. For example, the current page from an eBook may be displayed on a display of the eBook reader device. Similarly, a song or audio book may be played on speakers of the device.

At 304, the device is transitioned to a non-active state. The non-active state may be a low-power state or a "sleep" state. The non-active state may be initiated in various ways. In one approach, transition to the non-active state follows a timeout period, and hence, the transition occurs when the user ceases engaging with the device for a threshold period of time. The device may automatically enter the non-active state after this period of inactivity, as represented by sub-act 304(1). In another approach, the transition to the non-active state may be tied to an explicit input from the user who is attempting to "power down" the device, as represented by sub-act 304(2). The user may actuate a power control, for instance, that directs the device to transition to the non-active state.

At 306, in response to detecting the device has transitioned to a non-active state, a "last" screen image associated with the content item rendered at 302 is displayed on display of the device. This last screen image is an image selected to convey the identity of a content item more readily to the user in the future that a blank screen. For instance, for eBooks, the last screen image may be an image of the author, the author's name, a book cover, a title of the book, a combination of those images, and so forth. For newspapers or magazines, the last screen image may be an image of an editor or publisher, a cover page, a graphical title, or any other combination of design elements that convey an identity of the newspaper or magazine. For an audio book, the last screen image may be that of the audio book cover or a picture of the actor who is reading the book.

At 308, the device detects a screen conversion event while in the non-active state. In one approach, the screen conversion event occurs after a defined amount of time has elapsed, represented by sub-act 308(1). The amount of time may be user configurable or a default period of time such as 30 minutes. In this approach, the last screen image displayed on the screen of the device may periodically change while the device is in the non-active state. For example, if an eBook has two authors, the screen conversion event 308 may change the last screen image from the first author to the second author. In another approach, the screen conversion event may be tied to an explicit input from the user, represented by sub-act 308(2). The input may include activating a button or control on the device, shaking the device if equipped with an accelerometer 228, touching a touch screen of the device, and the like. The user input that initiates a screen conversion event is different from a user input that returns the device to an active state. For example, pressing a power button may return the device to an active state while pressing any other button may initiate a screen conversion event.

At 310, in response to detecting the screen conversion event, another image having a meaningful association with the content item is displayed as a last screen image on the display of the device. For example, the first image associated may be an author image and the second image may be a cover image as shown in FIG. 1.

Figure 4:
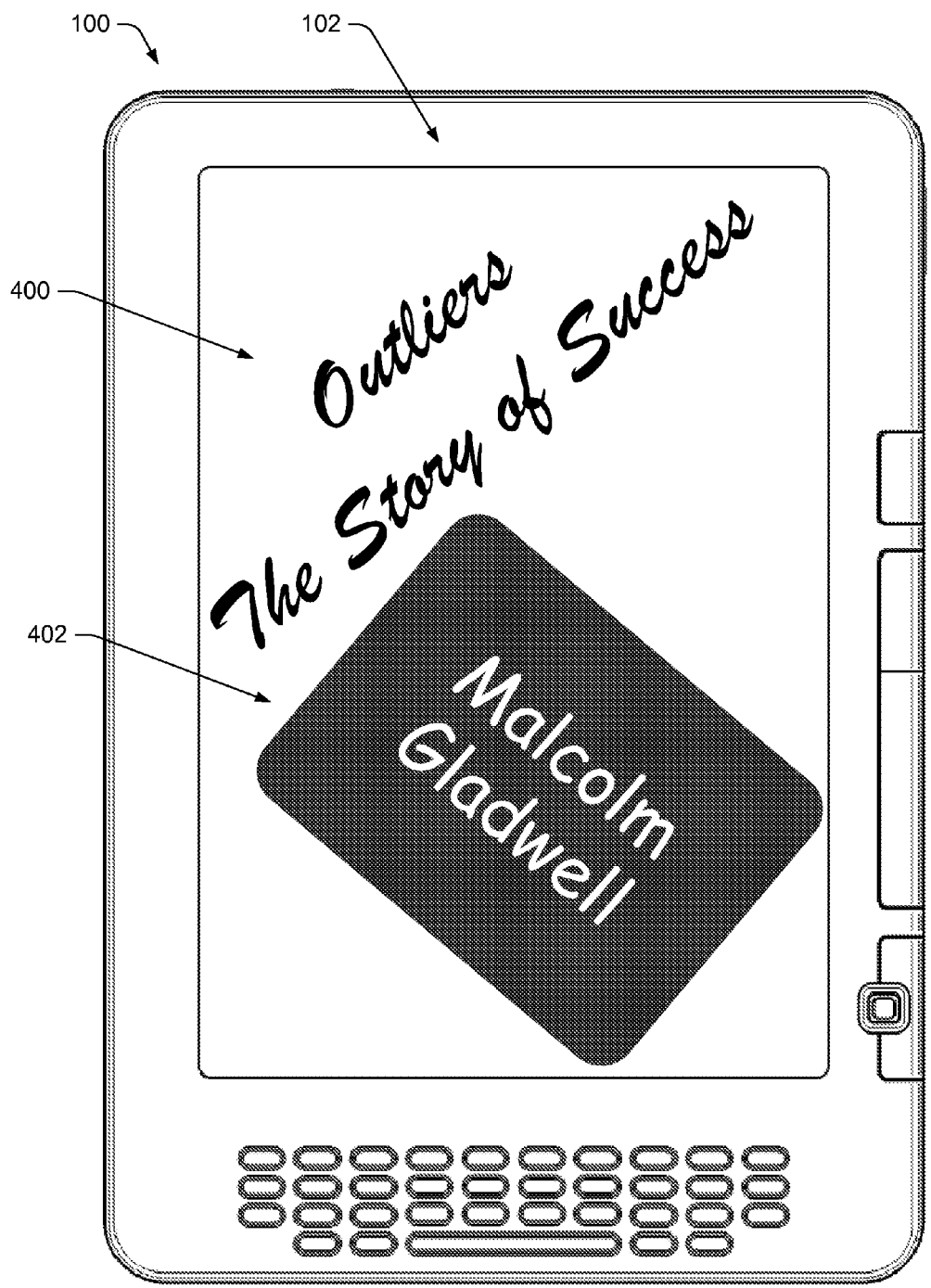
FIG. 4 shows a front plan view of the eBook reader device with a last screen image depicted on the display. The last screen image shows the title of a content item that the user has most recently consumed.

FIG. 4 shows the eBook reader device 100 of FIGS. 1 and 2 displaying a textual last screen image. In additional to an author image 112 or a cover image 114 as shown in FIG. 1, the title 400 or the name of an author 402 of an eBook may be presented on the display 102 of the to the eBook reader device 100. The last screen rendering module 110 may modify fonts or visual display characteristics of the text. Although shown together in this example, either the title 400 or the author name 402 may be displayed separately as the last screen image.

The textual last screen image may include other text having a meaningful association with the content item presented on the eBook reader device 100 prior to transitioning to the non-active state. Text the user generates on the eBook reader device 100 about the content item may be used as the last screen image. For example, text the user enters in an e-mail, text message, posting to a social networking site, or the like may appear on the last screen image by itself or in combination with other elements such as a title.

Figure 5:
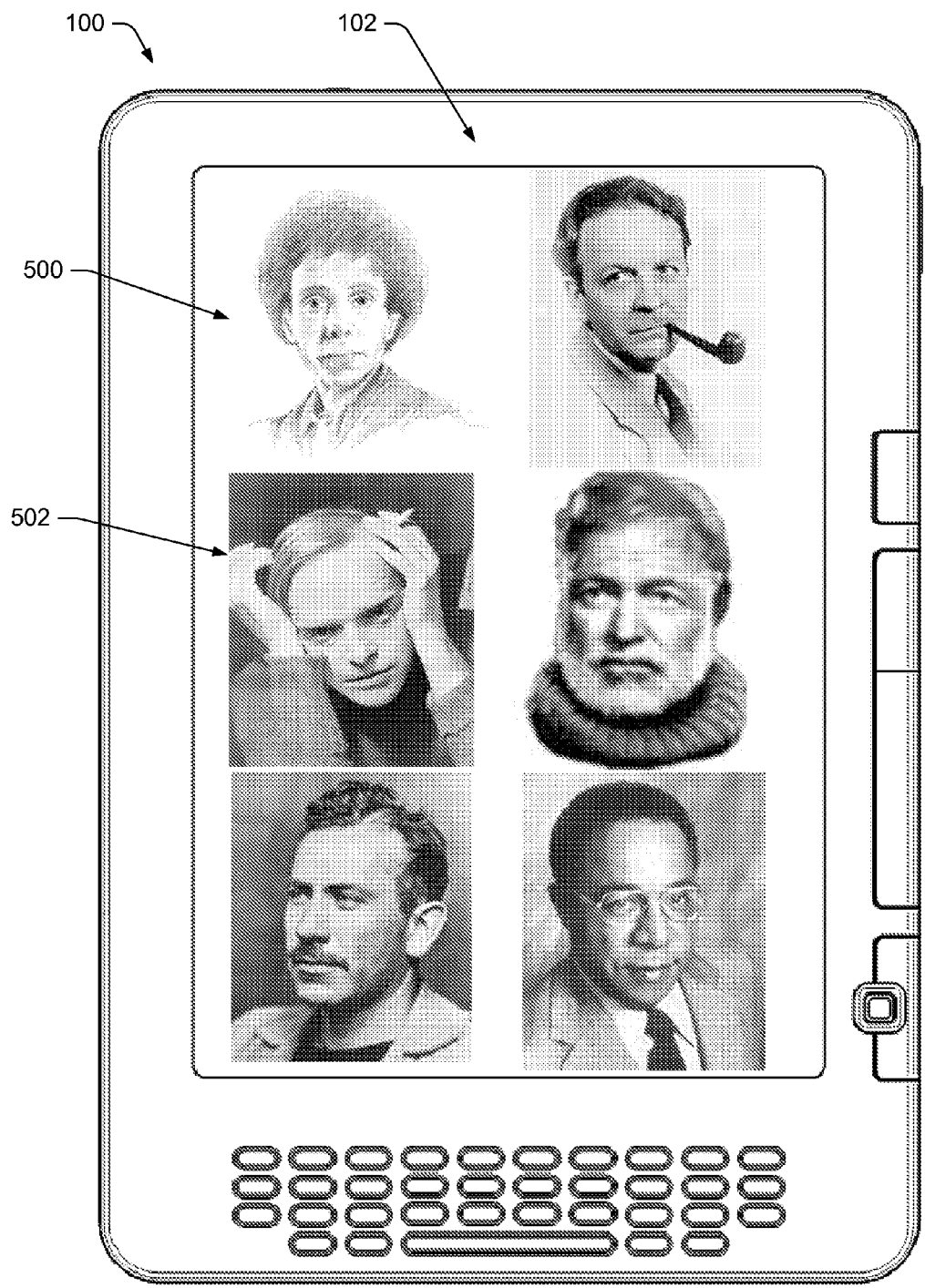
FIG. 5 shows a front plan view of the eBook reader device with a last screen image depicted on the display. The last screen image depicts multiple authors associated with eBooks available on the eBook reader device.

FIG. 5 shows a different type of last screen image that may be displayed on the display 102 of the eBook reader device 100. The previous examples of last screen images include elements associated with an eBook that was presented on the eBook reader 100 immediately prior to transitioning to the non-active state. However, graphical or textual representations of elements associated with other content items may also be included in the last screen image. For example, the last screen image may include multiple author images 500 and 502. One author image 500 may be that of the author of the most recently displayed eBook. In this example, that is the author image 500 of Malcolm Gladwell who wrote "Outliers." A second author image 502 may be of an author that is not associated with the eBook "Outliers."

The memory 204 of the eBook reader device 100 may contain multiple content items 208 and some of those content items 208 may be associated with author images 210 that are also stored in the memory 204. The last screen rendering module 110 may draw upon the author images 210 to create a collage or other arrangement of multiple author images which is displayed as the last screen image. In one arrangement, the multiple author images shown in the last screen image may be arranged in the order that the user read the corresponding eBooks. For example, if the eBook most recently accessed by the user was authored by Malcolm Gladwell and the eBook read immediately before that was authored by Truman Capote, the order of author images 500 and 502 shown in the last screen image may reflect this reading order. Alternatively, author images shown as the last screen image may be arranged according to any type of ordering. For example, the ordering of author images shown on the last screen image may reflect the order in which the user purchased or acquired the eBooks, the order may be random order, or another type of ordering.

Figure 6:
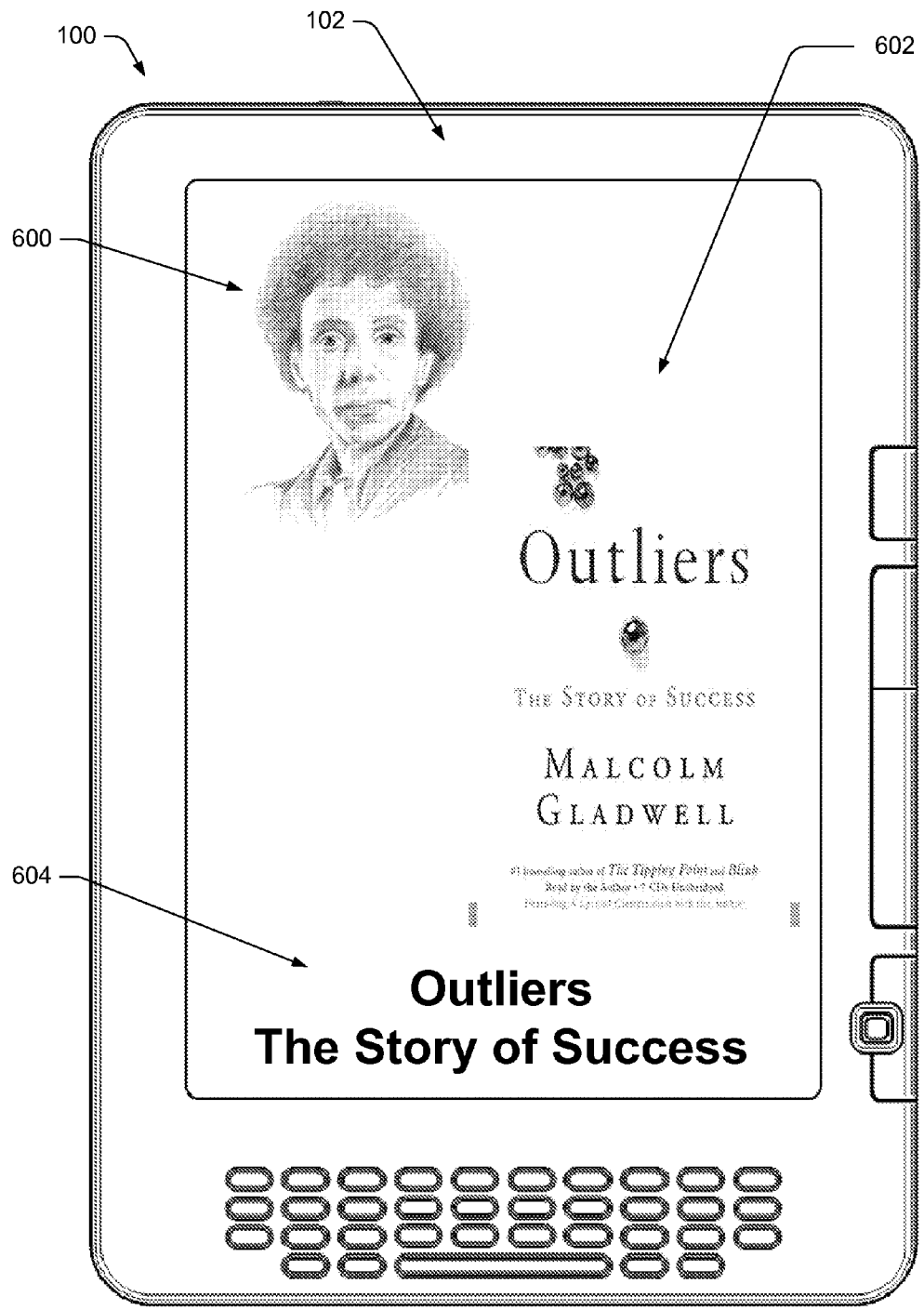
FIG. 6 shows a front plan view of the eBook reader device with a last screen image depicted on the display. The last screen image depicts a collage of an author image, a visual representation of a cover, and a title of a content item that the user has most recently consumed.

FIG. 6 shows an alternative type of last screen image that may be displayed on the display 102 of the eBook reader device 100. This type of last screen image includes multiple elements all related to the eBook most recently presented prior to transitioning to the non-active state. In this example, the display 102 shows an author image 600 of Malcolm Gladwell, a visual representation of the cover 602 of the eBook "Outliers," and the title 604 of the eBook. Any of these three elements may be omitted and/or additional elements related to the eBook may be included in the last screen image.

Figure 7:
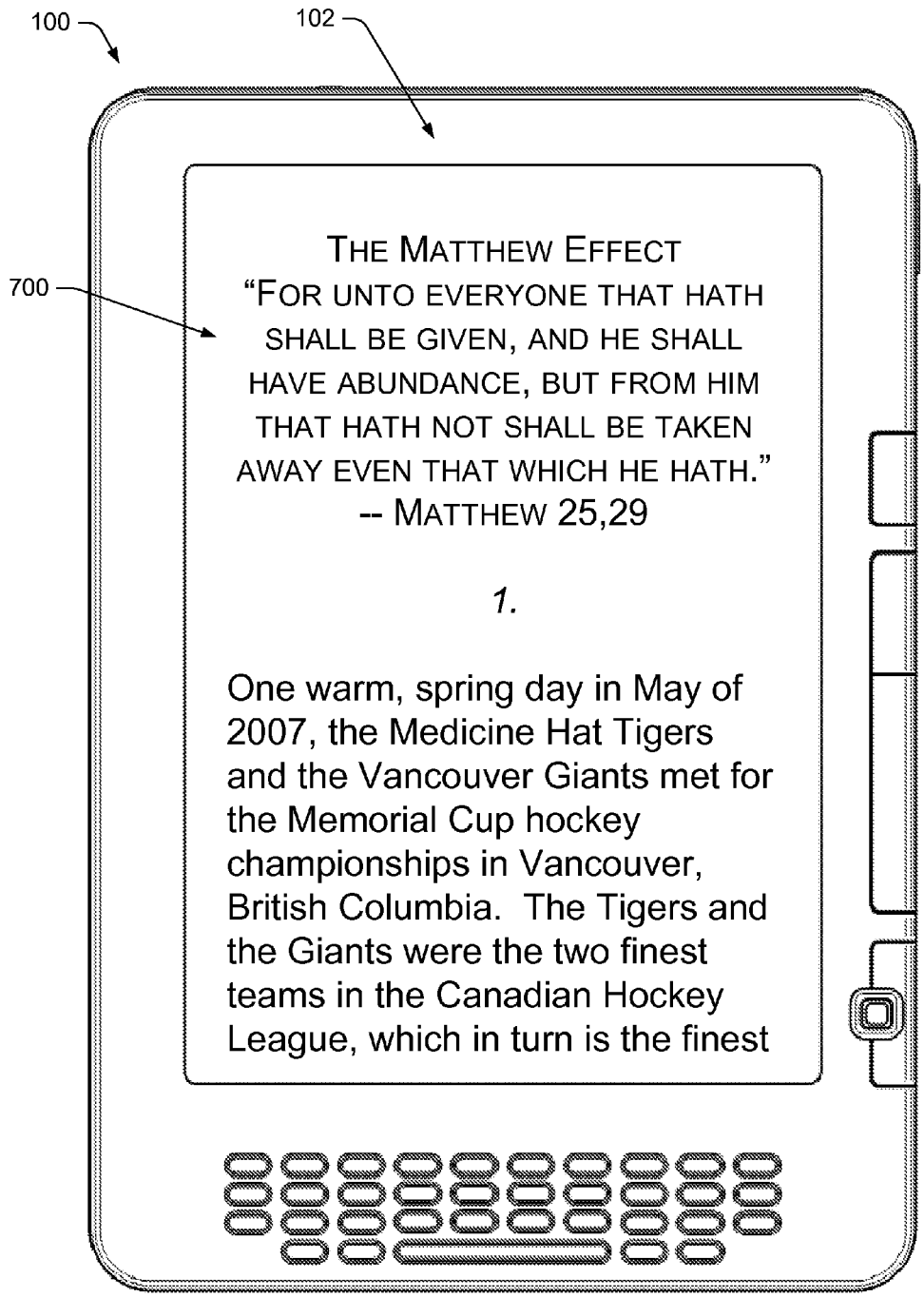
FIG. 7 shows a front plan view of the eBook reader device with a page of an eBook depicted on the display.

FIG. 7 shows a page of the eBook "Outliers" on the display 102 of the eBook reader device 100. The page shown here, similar to the page 108 shown in FIG. 1, represents a view of the eBook reader device 100 as the user is actively reading through the eBook. The user may interact with the eBook in many ways such as by advancing a page forward, moving a page backwards, skipping to different chapter, etc. As discussed above, the user may also input a command that causes the last screen rendering module 110 to display a last screen or the user may stop interacting with the eBook reader device 100 in which case the last screen may appear after a period of time elapses. The user may also interact with the text of the eBook by selecting a portion of the text 700 such as the quotation from Matthew shown in this example.

Figure 8:
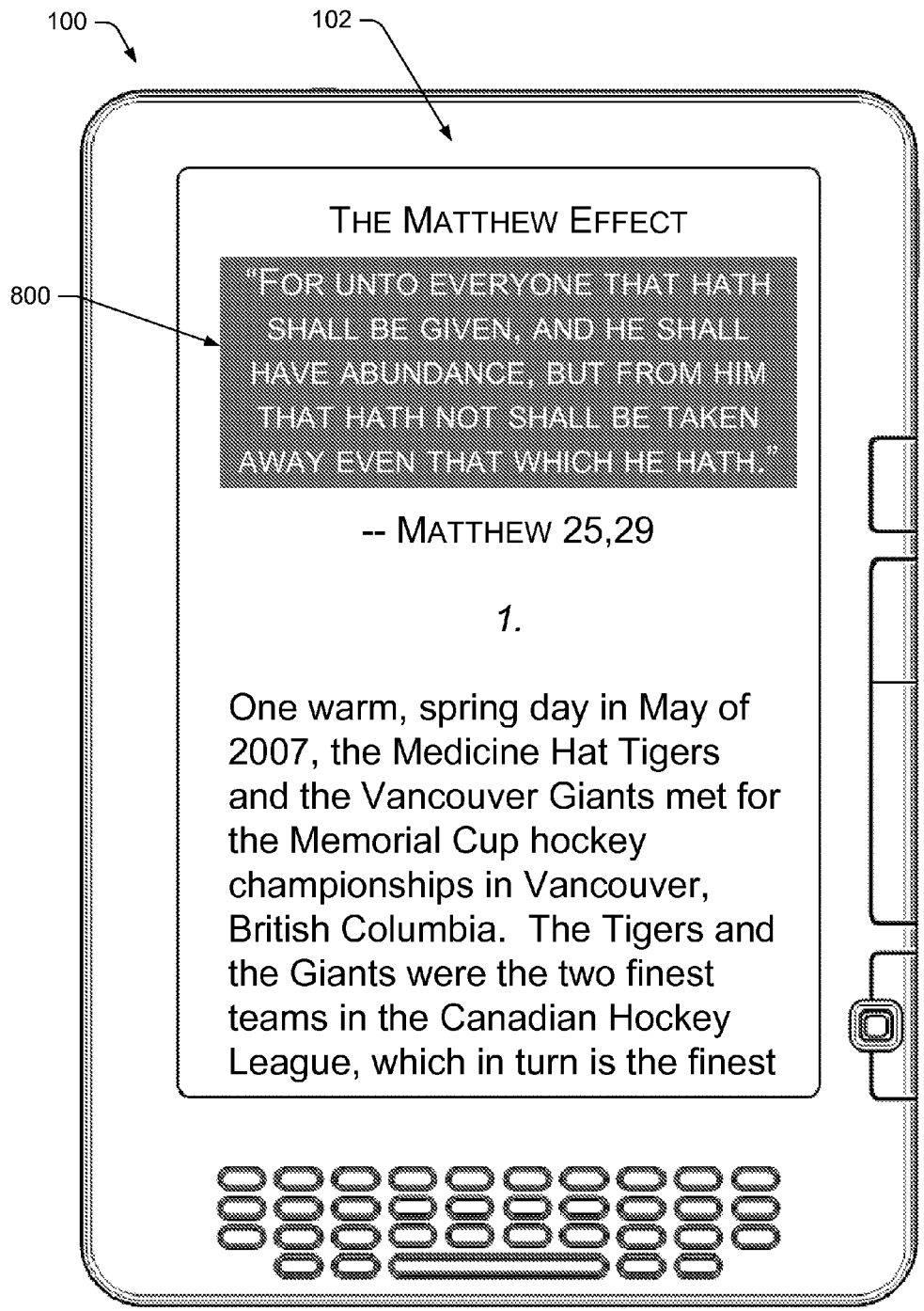
FIG. 8 shows a front plan view of the eBook reader device with a page of an eBook that is partially highlighted depicted on the display.

FIG. 8 shows the same page from the eBook "Outliers" as is shown in FIG. 7. In this view, the user has selected the portion of text 700 which is indicated here as highlighted text 800. "Highlights" as used herein indicate a portion of a content item that is selected or tagged in a way to differentiate the highlighted portion from other portions of the same content item. Portions of text may be highlighted, sections of a song may be tagged, a region of an image or video may be selected, and the like in order to "highlight" or differentiate the respective portions of those content items. Displaying user highlights as the last screen image when the eBook reader device is in the non-active state allows each user to personalize the appearance of his or her device.

The highlights may be stored in the highlight(s) module 212 of the eBook reader device 100. Each highlight is associated with the content item from which it was selected. Although this example shows a user-selected highlight, other entities such as an author, publisher, teacher, friend, etc. may also highlight sections of documents and, depending on the configuration of the eBook reader device 100 such as privacy settings, highlights made by entities other than the user may be available in the highlight(s) 212 module.

Figure 9:
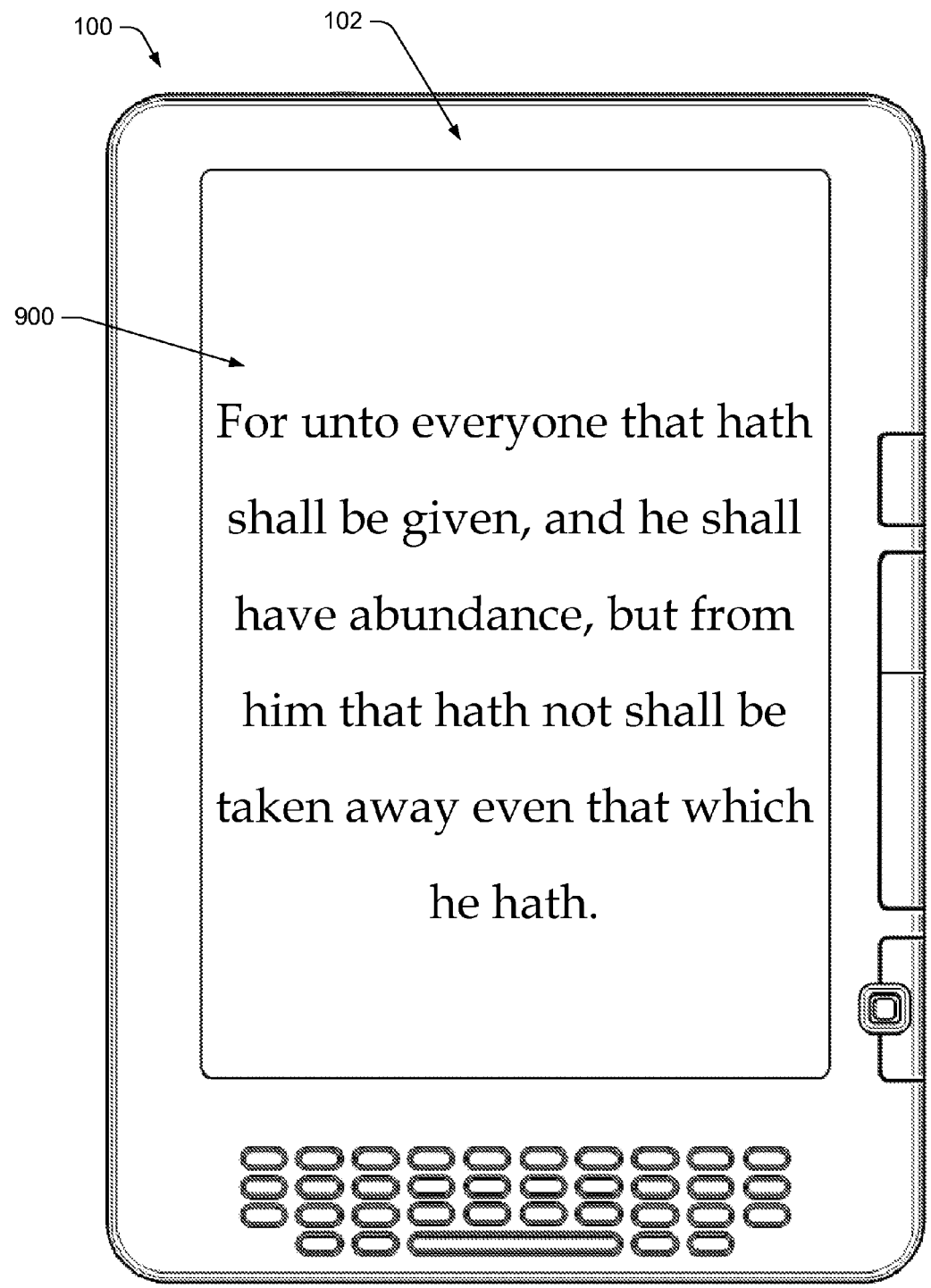
FIG. 9 shows a front plan view of the eBook reader device with a last screen image depicted on the display. The last screen image depicts a highlighted portion of an eBook that the user has most recently consumed.

FIG. 9 shows a last screen image displaying a highlight 900. The highlight may be selected from the eBook that was last accessed by the user prior to the eBook reader device 100 entering the non-active state. If the eBook includes multiple highlights, the highlight closest to the section of the eBook that was last displayed may be selected as the last screen image. For example, if the user was viewing the page of the eBook shown in FIGS. 7 and 8 immediately prior to the eBook reader device 100 entering the non-active state, the passage from Matthew would be the highlight 900 shown as the last screen image because that highlight is the closest (i.e., on the same page) highlight to the most recently displayed section of the eBook.

Figure 10:
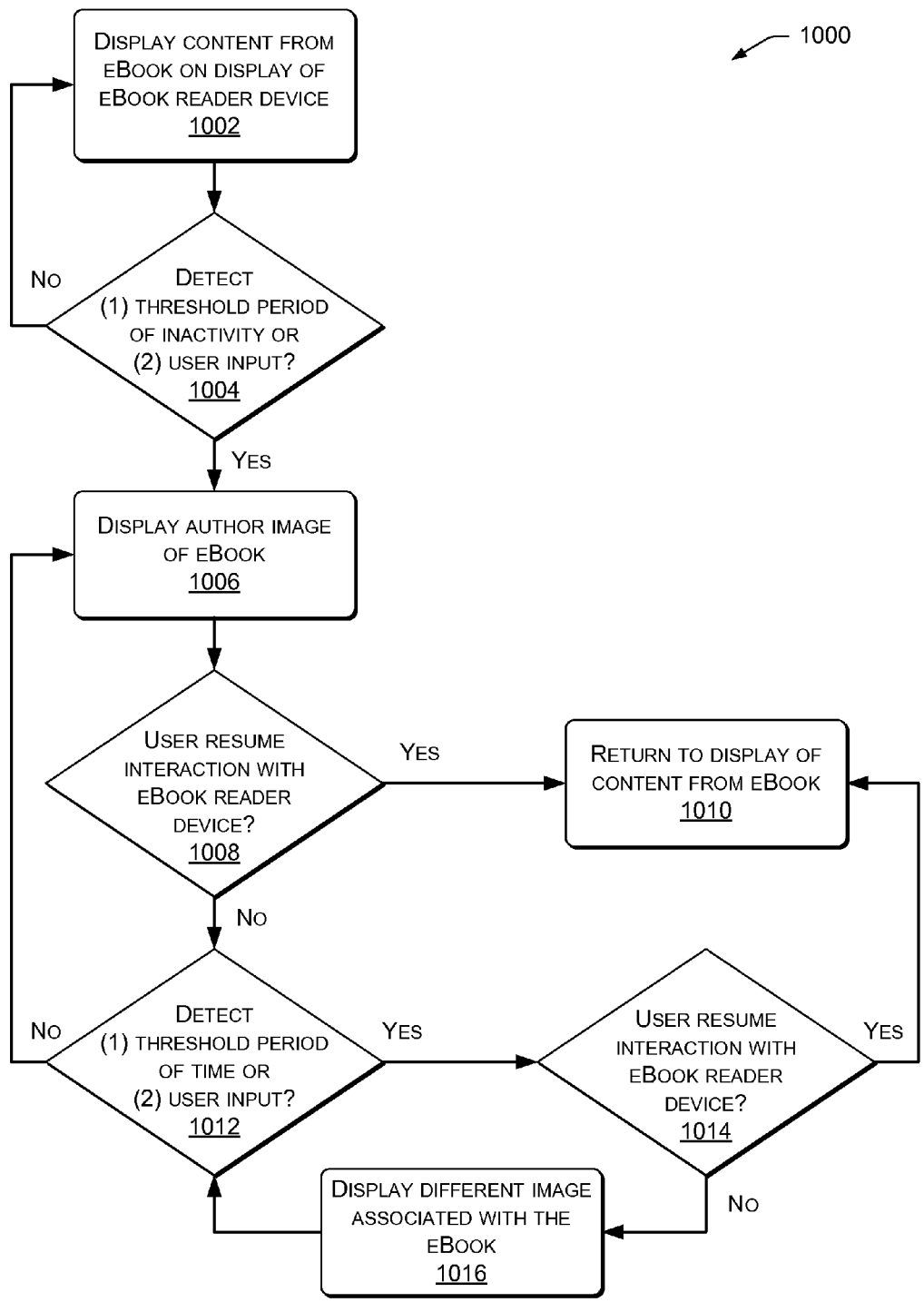
FIG. 10 is a flow diagram illustrating a process for changing the display of the eBook reader device to an author image and additionally changing the display to a different image that is relevant to an eBook that a user has most recently consumed.

FIG. 10 shows a process 1000 for changing a display of an eBook reader device to show an author image when the device is transitioned to a non-active state and to show a different image as the last screen image in response to a screen conversion event. The process 1000 begins when the user is interacting with the eBook reader device to consume content such as reading an eBook.

At 1002, content from the eBook is displayed on the display of the eBook reader device. Content from the eBook may continue to be displayed on the eBook reader device so long as the user continues interacting with eBook reader device such as by making a page turn request.

At 1004, the eBook reader device transitions to a non-active state after a threshold period of inactivity, following a period in which the user was regularly interacting with the eBook reader device is detected or in response to a user input to power down the device. This inactivity may be manifest in different ways, including by a failure to receive any input from the user (e.g., page turn request, navigation, adding an annotation, etc.) for a period of time, or by a failure to detect any movement of the device by the accelerometer 228 (if present), or other ways.

The period of inactivity may be a fixed period of time set by the user or configured as a default setting of the device. The period of inactivity may also be a variable and based upon a reading speed of the user or the eBook that was last displayed prior to the eBook reader entering the non-active state. For example, slow readers may take several minutes to finish reading a screen of text, and thus, if the period of inactivity was set too short then the last screen display may become active while the user is still reading. The reading speed of a given user may also vary depending on the content. For example, the user may read a textbook slower than a novel. A combination of the users reading speed and the type of eBook may also be the basis for determining a variable period of inactivity.

If the inactivity has not continued for the threshold period of time or if the user has not provided a "power down" or turn off type of input, then the electronic book reader device continues to display the eBook as shown by process 1000 returning from 1004 back to 1002 (e.g., the "no" path). However, if either the specified period of inactivity has been reached or if the user has explicitly indicated that he or she wishes to place the eBook reader device into a non-active state, then process 1000 proceeds along the "yes" path to 1006.

At 1006, an image of the author of the eBook is displayed. The author image may, depending on the content item, instead show an image of an editor, a musician, an actor, the subject of the biography, or other person associated with the content item. The eBook reader device may remain in this non-active state displaying the author image until some triggering event causes a change in the image displayed by the eBook reader device. For eBook reader devices that have a bi-stable display, an image may be maintained on the display indefinitely without consuming power.

At 1008, it is determined if the user has once again begun to interact with the electronic book reader device following display of the author image. If so, the eBook reader device restores the display of the content of the electronic book that was last presented prior to entering the non-active state thereby allowing the user to pick up reading where he or she was before. This is represented by process 1000 proceeding to 1010 (e.g., along the "yes" path).

However, another triggering event for ceasing the display of the author image is a screen conversion event that changes the image displayed on the eBook reader device while keeping the device in the non-active state. Thus, the screen conversion event may alter the last screen image without "waking up" the eBook reader device.

At 1012, a screen conversion event may be detected. The screen conversion event may be detected based upon passage of a threshold period of time. This threshold period of time may be the same or different than the threshold period of inactivity in 1004. The screen conversion event may also be initiated in response to user input such as pressing a button, touching a touch screen (if equipped), moving or shaking the eBook reader device to activate an accelerometer (if equipped), and the like.

If a screen conversion event is not detected (e.g., the threshold period of time has not elapsed and there has been no user input) the eBook reader device continues to display the author image. This is represented by process 1000 returning to 1006 along the "no" path from 1012. However, if a screen conversion event is detected, process 1000 proceeds along the "yes" path.

During display of the different image, the eBook reader device remains in the non-active state. The eBook reader device may be "woken up" or returned to an active state by the user at any time. At 1014, resumption of user interaction with the eBook reader device may be detected. User interaction includes an explicit wake-up command, power-on command or any other interaction designated to return the eBook reader device to an active state. The type of user interaction which returns the eBook reader device to an active state is different than the user input interpreted as a screen conversion event at 1012. For example, pressing a power button may be interpreted as the user resuming interaction with eBook reader device whereas shaking the device may be interpreted as signaling a screen conversion event.

If the user does not resume interaction with the eBook reader device the last screen image may be changed again. This change is represented by process 1000 proceeding along the "no" path from 1014 to 1016. At 1016, in response to detection of the screen conversion event, a different image also associated with the most recently viewed eBook is displayed. The different image may include an image of additional author(s), a cover image for the eBook, a highlighted passage from the eBook, the eBook's title, a name of one or more of the authors, and the like. For example, if a given eBook has two authors, the image of the first author may be displayed upon entering the non-active state and that image may change (e.g., after 30 minutes) to an image of the second author. The different image displayed at 1016 may remain on the display of the eBook reader device until a subsequent screen conversion event is detected at 1012.

Assuming that the screen conversion event is the passage of 30 minutes, the image displayed on the eBook reader device while the device is in the non-active state may change every 30 minutes until the user resumes interaction with the device. For example, multiple images associated with the most recently accessed content item (e.g., an author image, a cover image, title text, etc.) may be alternatively displayed when the eBook reader device is in the non-active state. Similarly, the sequence of displayed images may begin with an image related to the eBook most recently displayed prior to the device entering the non-active state and then transition to a different last screen image that is not necessarily associated with the eBook. For example, upon entering the non-active state the eBook reader device may display an author image of the author of the most recently viewed eBook and then after a period of time, or user input, the author image for a different eBook that is available on the eBook reader device may be displayed.

Whenever the user resumes interaction with the eBook reader device, other than the limited interaction that is interpreted as a screen conversion event, the eBook reader device may "wake-up." This is shown by process 1000 proceeding along the "yes" path from 1014 to 1010. As discussed above, at 1010 the eBook reader device restores the display of the content of the eBook that was last presented prior to entering the non-active state.

Figure 11:
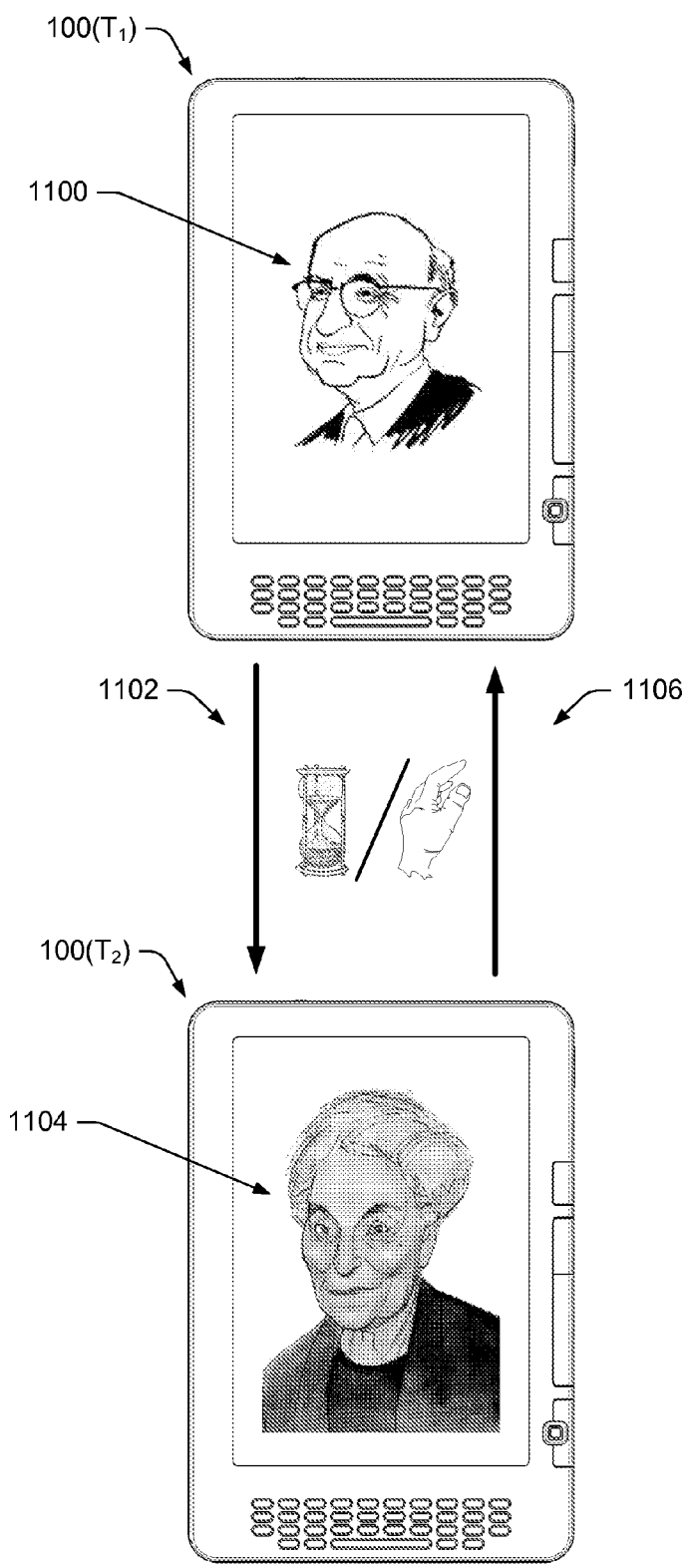
FIG. 11 shows a front plan view of the eBook reader device with alternating images of multiple authors depicted on the display.

FIG. 11 shows the display of the eBook reader device 100 alternating between two author images of a co-authored eBook. Upon entering the non-active state at a first time $T_1$ an author image of the first author 1100 is rendered as the last screen image on the eBook reader device 100($T_1$). Following a timeout period or a user input 1102, the image on the screen is replaced with an author image of the second author 1104. Thus, at time $T_2$ the last screen image visible on the eBook reader device 100($T_2$) is the second author 1104. The image of the second author remains until the user once again begins interacting with the device, or until another screen conversion event 1106 occurs (e.g., passage of time or user input). The second screen conversion event 1106 may return the display the eBook reader device 100($T_1$) back to showing the first author 1100. Similar conversions may be implemented for eBooks having three or more authors.

Some co-authored books, anthologies, textbooks, collections of short stories or poems, and the like may have discrete sections or chapters authored by different individuals. When a user is consuming an eBook that includes at least two portions, each portion associated with a different author, the author image displayed as the last screen image may be based on the portion of the eBook that was last presented prior to transitioning to the non-active state. For example, if the user was reading a page from chapter 2 when the eBook reader device transitions to a non-active state, the last screen image will show the author associated with chapter 2 of that eBook.

Figure 12:
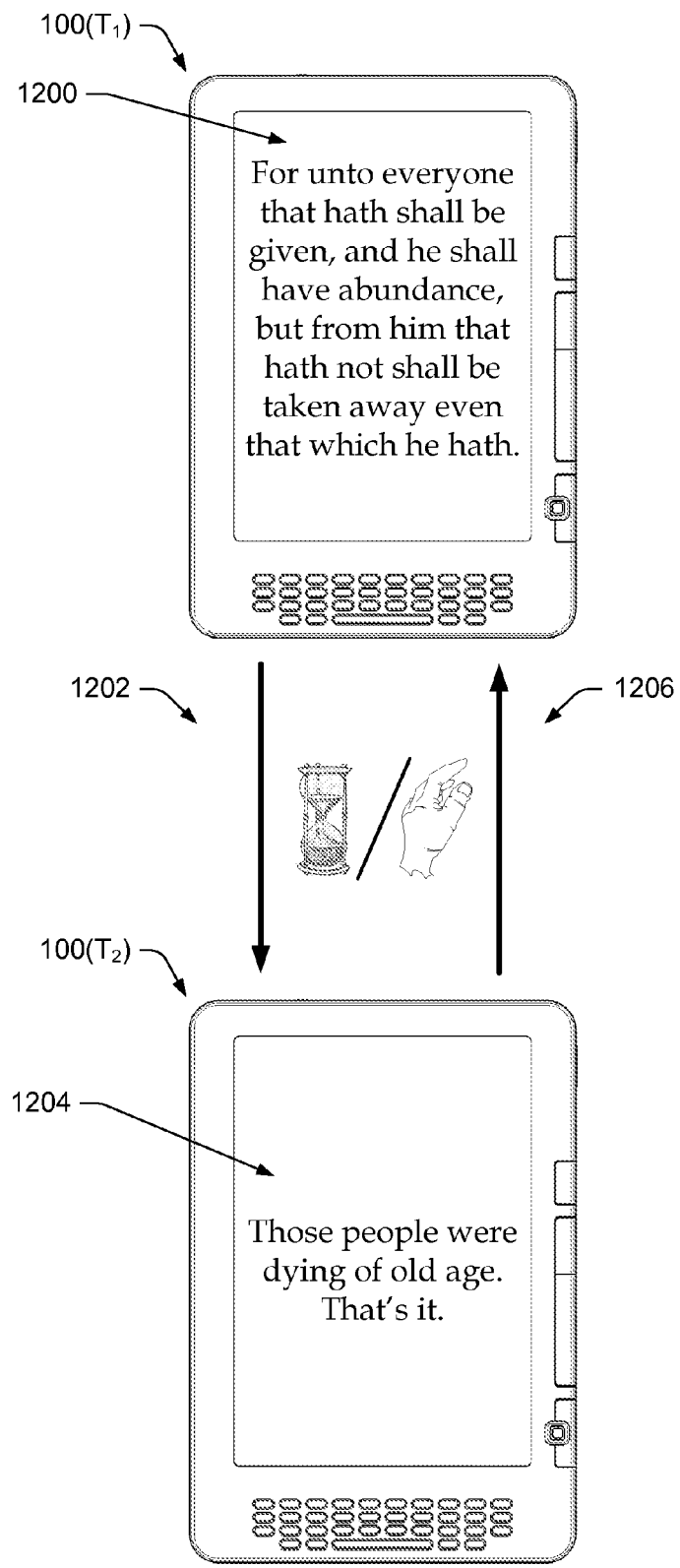
FIG. 12 shows a front plan view of the eBook reader device with alternating images of highlighted passages from an eBook depicted on the display.

FIG. 12 shows the display of the eBook reader device 100 alternating between two highlighted passages of an eBook. Upon entering the non-active state at a first time $T_1$ a first highlighted passage 1200 from the eBook is rendered as the last screen image on the eBook reader device 100($T_1$). Following a timeout period or a user input 1202, the image on the screen is replaced with a second highlighted passage 1204 from the eBook. Thus, at time $T_2$ the last screen image visible on the eBook reader device 100($T_2$) is the second highlighted passage 1204. The second highlighted passage remains on the display until the user once again begins interacting with the device, or until another screen conversion event 1206 occurs (e.g., passage of time or user input). The second screen conversion event 1206 may return the display the eBook reader device 100($T_1$) back to showing the first highlighted passage 1200. Although shown here as a transition between two highlighted passages 1200, and 1204, the last screen image may cycle through any number of highlighted passages in a similar manner. For example, last screen images displaying highlighted portions of a textbook may serve as a study aid by allowing the user to review those portions of the textbook that he or she deemed important enough to highlight.

Figure 13:
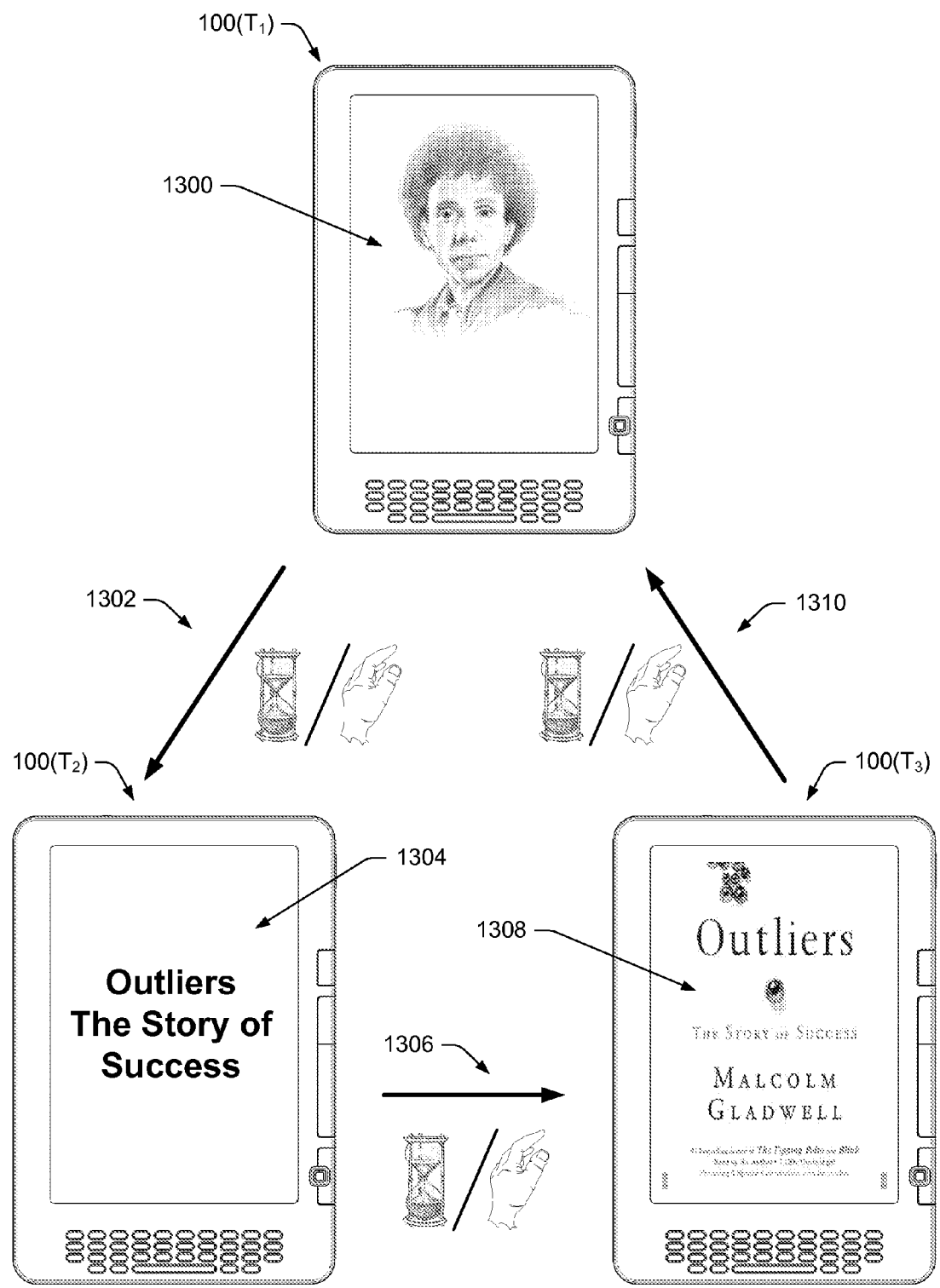
FIG. 13 shows a front plan view of the eBook reader device with a rotation of an author image, a title, and a visual representation of a cover of an eBook depicted on the display.

FIG. 13 shows alternation of a last screen image between an author image, title text, and a cover image. FIGS. 11 and 12 illustrated alternation of two different images on the display of the eBook reader device during a non-active state. FIG. 13 illustrates alternation between three different images, but the systems and processes discussed herein enable displaying any number of last screen images while the eBook reader device is in the non-active state.

Upon entering the non-active state at a first time $T_1$ an author image 1300 from the eBook "Outliers" is rendered as the last screen image on the eBook reader device 100($T_1$). Following detection of a screen conversion event 1302 (e.g., a passage of time or user input) the author image 1300 is replaced by the title 1304 of the eBook on the screen of the eBook reader device 100($T_2$). A second screen conversion event 1306 may in turn cease displaying the title 1304 and instead display a cover image 1308 of the eBook on the screen of the eBook reader device 100($T_3$). A further screen conversion event 1310 may change the image displayed on the screen from the cover image 1308 back to the author image 1300 shown initially at time $T_1$.

This rotation may continue until the eBook reader device is returned to an active state. As discussed previously, each of the screen conversion events 1302, 1306, and 1310 may be based upon the passage of time or input from the user. Thus, the eBook reader device may alternate the displayed last screen image while maintaining an appearance having some relevance to the book that the user is presently reading (e.g. "Outliers"). Although shown in a particular order (i.e., author image, title, cover image) the last screen image conversions shown in FIG. 13 may be implemented in any order including a random order. For example, upon detecting the screen conversion event 1302 the eBook reader device 100 may transition to displaying either the title 1304 or the cover image 1308 and one of those damages is selected randomly. Additionally, the series of possible images may include more than three images. The last screen images may be of multiple authors associated with the eBook, multiple highlights indicated by the user or the author, or another type of image.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims

What is claimed is:

1. A computer-implemented method comprising:
    under control of an electronic book reader device configured with executable instructions, performing the following:
    displaying content from an electronic book on a display of the electronic book reader device, the electronic book having an associated author image of an author of the electronic book;
    detecting at least one of (1) a threshold period of inactivity in which a user ceases interacting with the electronic book reader device or (2) a user input to transition the electronic book reader device to a non-active state; and
    responsive to the detecting, displaying the author image associated with the electronic book.

2. The computer-implemented method of claim 1, wherein the threshold period of inactivity is configurable by the user.

3. The computer-implemented method of claim 1, wherein the threshold period of inactivity is based at least in part on a reading speed of the user.

4. The computer-implemented method of claim 1, wherein the threshold period of inactivity is based at least in part on the electronic book.

5. The computer-implemented method of claim 1, wherein the author image comprises a graphical representation of multiple authors, each of the authors associated with the electronic book.

6. The computer-implemented method of claim 1, wherein the displaying the author image associated with the electronic book further comprises additionally displaying an author image associated with a second electronic book, the electronic book and the second electronic book both available on the electronic book reader device.

7. The computer-implemented method of claim 1, wherein the electronic book includes at least two portions, each portion associated with a different author and the author image comprises a graphical representation of the author associated with the portion of the electronic book that was last presented prior to transitioning to the non-active state.

8. The computer-implemented method of claim 1, further comprising, whereupon the user begins interacting with the electronic book reader device following display of the author image, restoring display of the content of the electronic book that was last presented prior to displaying the author image.

9. The computer-implemented method of claim 1, further comprising:
    detecting, when the electronic book reader device is in the non-active state, at least one of (1) passage of a threshold period of time or (2) a user input indicating a screen conversion event; and
    responsive to the detecting, when the electronic book reader device is in the non-active state, replacing the author image with a different image associated with the electronic book.

10. The computer-implemented method of claim 9, wherein the different image comprises a graphical representation of a cover of the electronic book.

11. The computer-implemented method of claim 9, wherein the different image comprises an author image of an additional author of the electronic book.

12. The computer-implemented method of claim 9, wherein the different image comprises a title of the electronic book.

13. The computer-implemented method of claim 9, wherein the different image comprises a portion of the electronic book highlighted by the user.

14. A computer-implemented method comprising:
under control of a device having a display and configured with executable instructions, performing the following:
rendering content from a content item;
transitioning the device to a non-active state responsive to (1) a threshold period of inactivity in which a user ceases interacting with the device or (2) a user input; and
presenting, on the display, a highlighted portion of the content item.

15. The computer-implemented method of claim 14, wherein the content item comprises at least one of an electronic book or a video content item.

16. The computer-implemented method of claim 14, wherein the image comprises a collage of the highlighted portion of the content item and at least one of an image of an author of the content item, a graphical representation of a cover of the content item, or a title of the content item.

17. The computer-implemented method of claim 14, further comprising:
detecting a screen conversion event while the device is in the non-active state; and
presenting, on the display in response to the screen conversion event, a second image associated with the content item.

18. The computer-implemented method of claim 17, wherein the screen conversion event comprises lapse of a defined amount of time.

19. The computer-implemented method of claim 18, wherein a subsequent visual representation associated with the content item is presented on the display each time the defined amount of time lapses.

20. The computer-implemented method of claim 17, wherein the screen conversion event comprises a user input.

21. A dedicated electronic book reader device, comprising:
a processor;
a memory accessible by the processor;
a bi-stable display to present one or more pages of an electronic book responsive to user input; and
a last screen rendering module stored in the memory and executable by the processor, the last screen rendering module detecting transition of the electronic book reader device to a non-active state and in response, causing the bi-stable display to present a visible representation associated with the electronic book, the visible representation comprising one of: an author image associated with the electronic book, a graphical representation of a cover of the electronic book, a title of the electronic book, or a highlighted portion of the electronic book.

22. The dedicated electronic book reader device of claim 21, wherein the transition of the electronic book reader device to a non-active state is responsive to user input.

23. The dedicated electronic book reader device of claim 21, wherein the last screen rendering module comprises a timer component to detect when a user ceases interacting with the dedicated electronic book reader device for a threshold period of time, the transition of the electronic book reader device to a non-active state generated responsive to the timer detecting passage of the threshold period of time.

24. The dedicated electronic book reader device of claim 23, wherein the timer component is further configured to detect a second screen conversion event and the last screen rendering module causing the bi-stable display to present a second visible representation associated with the electronic book in response to the second screen conversion event.

25. The dedicated electronic book reader device of claim 24, wherein the second visible representation comprises at least one of the author image associated with the electronic book, the graphical representation of a cover of the electronic book, the title of the electronic book, or the highlighted portion of the electronic book, wherein the second visible representation is different from the visual representation.

26. The dedicated electronic book reader device of claim 21, wherein the dedicated electronic book reader device further comprises an author image module stored in the memory and the visual representation comprises an author image stored for use by the author image module and associated with the electronic book.

27. The dedicated electronic book reader device of claim 21, wherein the dedicated electronic book reader device further comprises a highlights module stored in the memory and the visual representation comprises a highlighted portion of the electronic book, the highlighted portion stored for use by the highlights module and associated with the electronic book.

28. A computer-readable storage medium having stored therein instructions, which when executed by an electronic book reader device having a display, cause the electronic book reader device to perform acts comprising:
rendering a first image representation of content in an electronic book;
detecting a transition of the electronic book reader device to a non-active state;
rendering a second image representation of a highlighted portion of the electronic book.

29. The computer-readable storage medium of claim 28, wherein the first image representation comprises one or more pages of the electronic book.

30. The computer-readable storage medium of claim 28, wherein the transition of the electronic book reader device to a non-active state occurs after a period of inactivity in which a user ceases interacting with the electronic book reader device.

31. The computer-readable storage medium of claim 28, wherein the transition of the electronic book reader device to a non-active state occurs in response to a user input.

32. The computer-readable storage medium of claim 28, wherein the highlighted portion of the electronic book comprises a portion of the electronic book previously indicated as highlighted by a user of the electronic book reader device.

33. The computer-readable storage medium of claim 28, wherein the highlighted portion of the electronic book comprises a portion of the electronic book previously indicated as highlighted by an author of the electronic book.

34. The computer-readable storage medium of claim 28, wherein the instructions cause the electronic book reader device to perform further acts comprising:
detecting a screen conversion event while the electronic book reader device is in the non-active state; and
responsive to detecting the screen conversion event, rendering a third image representation of a different highlighted portion of the electronic book.

35. The computer-readable storage medium of claim 34, wherein the screen conversion event comprises at least one of (1) passage of a threshold period of time or (2) a user input.

36. The computer-implemented method of claim 14, wherein the highlighted portion of the content item comprises a portion of the content item previously indicated as highlighted by an author of the content item or by a user of the content item.

* * * * *